April 15, 1930.                A. L. BAUSMAN                1,754,846
                FEEDING APPARATUS FOR CONFECTIONERY MACHINES
                    Filed Oct. 31, 1927        5 Sheets-Sheet 1

INVENTOR.
Alonzo Linton Bausman
BY Chapin & Neal
ATTORNEYS.

April 15, 1930.  A. L. BAUSMAN  1,754,846
FEEDING APPARATUS FOR CONFECTIONERY MACHINES
Filed Oct. 31, 1927    5 Sheets-Sheet 4

INVENTOR.
Alonzo Linton Bausman
BY Chapin & Neal
ATTORNEYS.

Patented Apr. 15, 1930

1,754,846

UNITED STATES PATENT OFFICE

ALONZO LINTON BAUSMAN, OF SPRINGFIELD, MASSACHUSETTS

FEEDING APPARATUS FOR CONFECTIONERY MACHINES

Application filed October 31, 1927. Serial No. 229,978.

This invention relates to improvements in feeding mechanism for confectionery machines, such for example, as confection coating machines, depositors and the like.

The invention is particularly directed to, and has for an object, the provision of improved feeding mechanism which will at the same time feed and aline the confections so that the confections will enter the confectionery machine in longitudinally-spaced, transversely-alined rows.

According to my invention, I make use of a series of short conveyers, arranged one forwardly of another with the delivery end of each in closely adjacent relation to the receiving end of the next succeeding conveyer, so that the confections, fed to the first of the series of conveyers, will be automatically transferred to succeeding conveyers and finally delivered by the last conveyer of the series to the confectionery machine. A feature of novelty, consists in moving these conveyers first forwardly and then rearwardly and in using, in conjunction with the conveyers, a series of stops, arranged one in each of the gaps between successive conveyers of the series. These stops, which are mounted to move into and out of the path of the confections carried by the conveyers, are positioned in the path of the confections, while the conveyers move rearwardly, whereby the confections will be drawn back against the stops and alined in transverse rows. The stops are moved out of the path of the confections before the conveyers again move forwardly, whereby each alined row of confections can freely pass to the next succeeding conveyer of the series and again be subjected to the alining action.

While one such conveyer and one such stop will effect the alining action and is within the scope of the invention, it is as a practical matter, preferable to use several conveyers and several stops in order to allow enough time during the feeding operation for the inspection of the goods. That is, it is desirable to allow time for an operator to remove broken or imperfect confections, supply confections to fill in any gaps in the rows, turn over any confections which may be upside down, and so forth.

While the confections may be placed on the described conveyers manually, it is usually desired to supply them automatically. This can be done, according to the broader aspects of the invention, by any suitable means. However, I prefer to accomplish the result by a known type of feeder, which feeds the confections in a number of transversely spaced rows. In this connection, it is an object of the invention to modify this feeder by making it work intermittently, rather than continuously as heretofore, and by timing it to work in coordinated relation with the aforesaid conveyers.

In connection with these conveyers, it is also an object of the invention to provide longitudinally disposed and transversely spaced guide bars, which will preserve the rows formed by the feeder, and to construct and arrange these bars so that they will permit the rising of the described stops, which could not be used with guide bars of ordinary construction.

While the particular type of confection machine with which the invention is used, is immaterial according to the broader aspects of the invention, it is another object to provide a feeding mechanism which will work in timed relation with a depositor. For example, in connection with a depositor of the type wherein a conveyer travels intermittently forward and while at rest also moves vertically toward and away from the depositor nozzles, the feeding mechanism of this invention is timed to cooperate with such a conveyer so that the confections are delivered thereto, and properly located thereon, so as to be subsequently carried by the conveyer to the nozzles, in properly centered relation therewith, to receive the confection deposits.

Other objects and advantages will appear in the following description and be pointed out in the appended claims.

The invention will be disclosed with reference to the accompanying drawings, in which:—

Figures 6, 7:
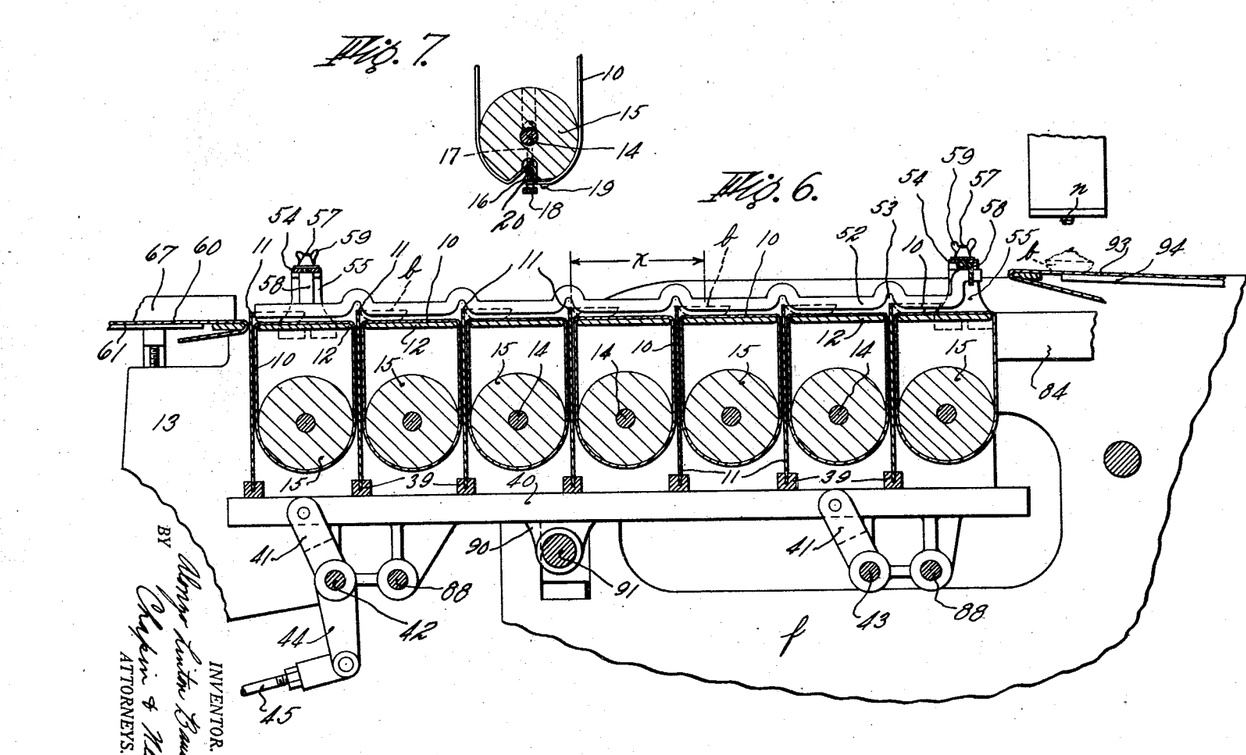
Fig. 6 is a longitudinal sectional view of the feeding and alining mechanism.
Fig. 7 is a detail view showing a preferred way of attaching the feeding belts to their rolls.

Referring to Fig. 6; the feeding and alining mechanism comprises a plurality of flexible members or belts 10, which in their confection supporting stretch are movable back and forth in a horizontal path, and a plurality of stop plates 11, which are vertically reciprocable and arranged so that their upper ends can be projected into the path of the confections carried by belts 10 or drawn downwardly out of said path. The several belts 10 are mounted one forwardly of the other with a short space or gap between the delivery end of one and the receiving end of the next. This gap is so small that the confections will readily and automatically pass from one conveyer 10 to another. The confection carrying stretch of each belt 10 is supported by a plate 12, the front and rear edges of which are rounded, as shown, to permit the ends of the belt to turn sharp corners and pass downwardly in vertical paths. The several plates 12 are mounted in longitudinally spaced relation and in a common horizontal plane, whereby the several belts provide a flat and substantially continuous feeding surface, unbroken except for the small gaps between adjacent belts. The stops 11 reciprocate in these gaps and are made thin so that the gaps may be made as short as possible.

Figures 2, 3, 4, 5:
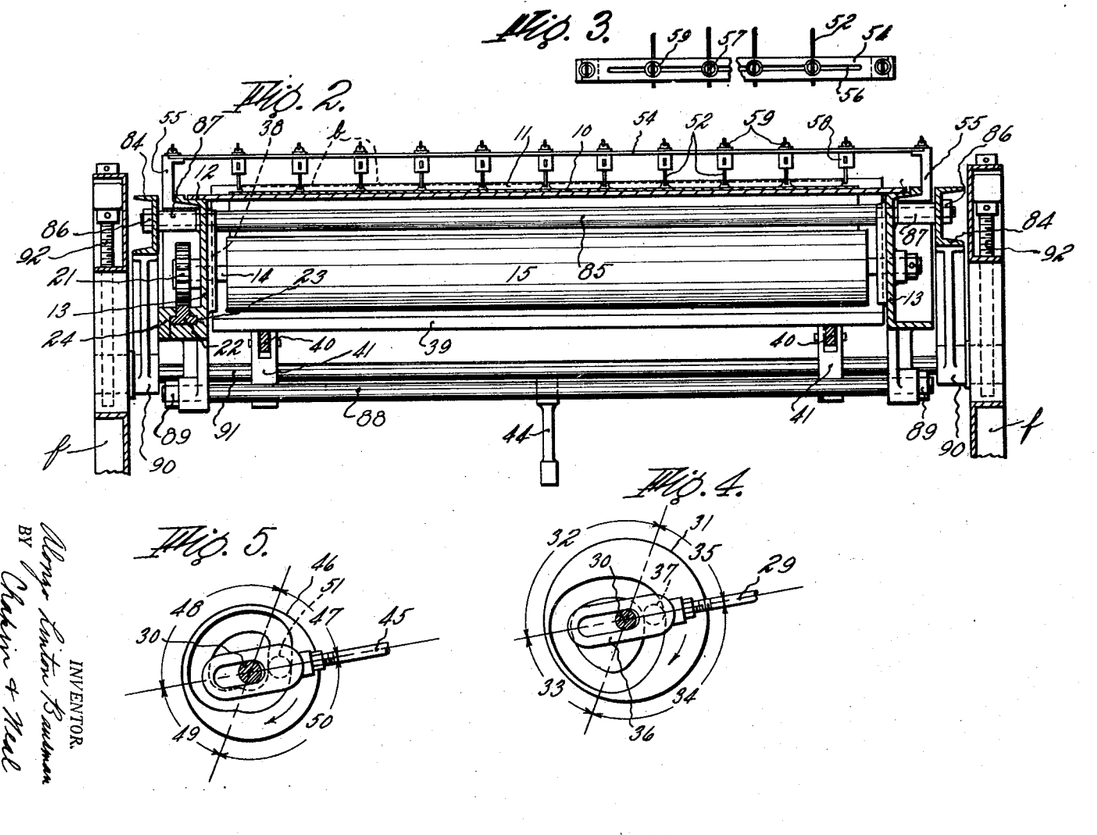
Fig. 2 is a cross sectional view taken on the line 2—2 of Fig. 1ᵇ.
Fig. 3 is a fragmentary top plan view showing the adjustable mounting of the guide bars shown in Fig. 2.
Figs. 4 and 5 are detail views of the cams for operating the stops and conveyers, respectively.

The plates 12 are supported at their ends by a laterally spaced pair of side frames 13 (see Fig. 2). Rotatably mounted in these frames are a series of shafts 14, one below each plate 12, and fixed to each such shaft is a roll 15. The depending ends of each belt or flexible member 10 are suitably secured to the underlying roll 15 in such a way as to permit the belt to move forwardly and backwardly in its upper stretch by a distance somewhat greater than the length of said stretch, say for example a distance such as indicated by dimension $x$ in Fig. 6. Preferably, one end of each flexible member 10 is connected to its roll 15 in a manner to permit of adjustment and one scheme for adjusting the belt is shown in Fig. 7. The roll 15 is recessed to receive a bar 16, to which one end of belt 10 is suitably secured. Screws 17 pass loosely through shaft 14 with their heads abutting the same and thread into bar 16. The outer end of each screw has fixed thereto a knurled piece 18, whereby the screws may conveniently be turned and the belt may be tightened in an obvious manner. The other end of belt 10 is fixed to roll 15 by screws 19 which also serve to hold in place a plate 20 against which the knurled pieces 18 abut, whereby the screws 17 are held against axial movement.

Figure 1A:
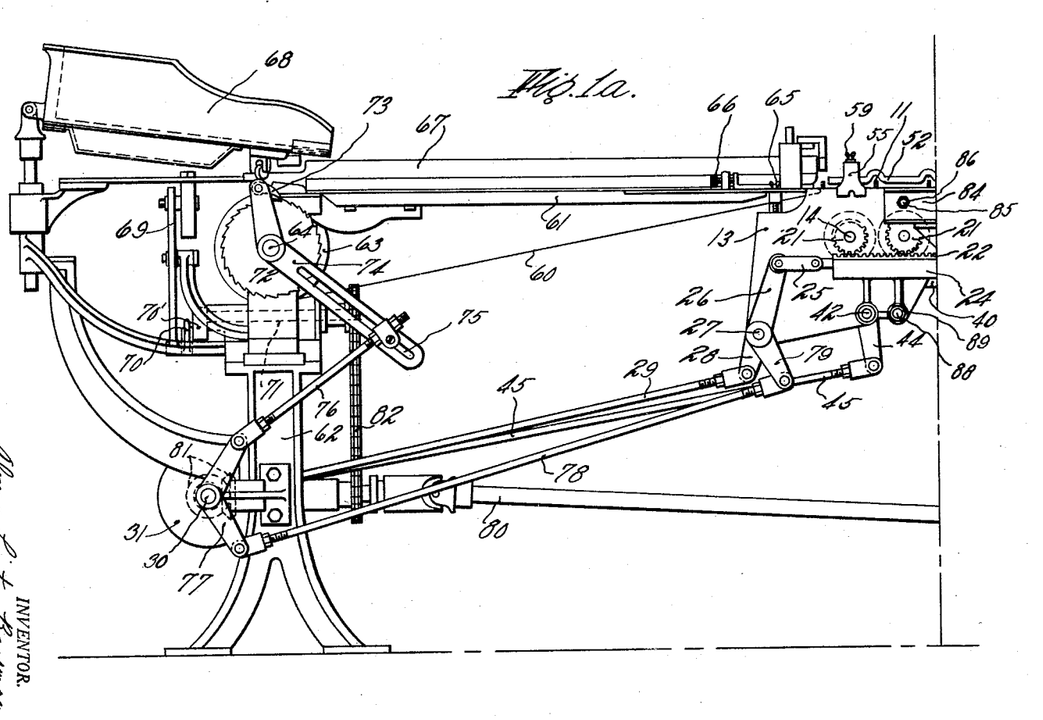
Figs. 1ª and 1ᵇ, when joined together along the dot-dash line, present a side elevational view of one adaptation of the invention, as arranged to feed confections to a depositor.

On one end of each shaft 14 is a gear 21 (see Figs. 1ª and 1ᵇ). In mesh with the several gears is a rack 22, which is horizontally reciprocable in a slideway 23 (Fig. 2), formed on the outer face of one of the side frames 13. A gib 24 holds the rack in place in said slideway. Referring to Fig. 1ª, the rack 22 is connected by a link 25 to the upper end of a lever 26, which is fixed to a shaft 27 mounted in frame 13. At another point on shaft 27 is fixed a lever 28 which is connected at its lower end to one end of a push rod 29. This push rod is reciprocated by a cam fixed to a drive shaft 30. This cam, designated 31, is shown in detail in Fig. 4. As there shown, the cam is a path cam having a rise portion 32, a high dwell portion 33, a drop portion 34 and a low dwell portion 35. The push rod 29 has adjustably attached thereto a part 36 which is slotted to receive shaft 30 and which carries a roll 37 to ride in the cam path. With the parts as shown in Figs. 1ª, 4 and 5, the several belts 10 have just come to rest at the end of their rearward movement and they will remain at rest until roll 37 rides onto the portion 32 of cam 27. Then push rod 29 will be moved toward the right, as viewed in Figs. 1ª and 4, thus moving rack 22 to the left and simultanenously turning all of the gears 21 in a clockwise direction, whereby the belts are advanced. After this advance movement of the belts, the cam path 33 causes them to dwell for an interval and after this dwell interval the cam path 34 causes them to move back into the illustrated positions.

The several stop plates 11 operate during the intervals of rest of belts 10. They are held in their upwardly projected positions illustrated, during the backward movement of the belts and, as shown, are about to drop. Each plate is preferably guided in a pair of vertical grooves 38 (Fig. 2) formed one on the inner face of each side frame 13. The lower end of each plate fits into a slot formed in the upper face of a bar 39 and is fixed thereto. The several bars 39 rest upon, and are suitably fixed to two bars 40 which extend longitudinally and in laterally-spaced, parallel relation. Each bar 40 is pivotally supported by a pair of parallel links 41. The forward link of each pair is fixed to an operating shaft 42, mounted to turn in frames 13. The rear link of each pair is fixed to a shaft 43 also mounted to turn in frames 13. Fixed to shaft 42 at a point intermediate its ends, is a lever 44 (Figs. 1ª and 2). A push rod 45, similar in all respects to push rod 29, is pivotally connected at one end to this lever. This push rod is reciprocated by a cam 46 fixed to shaft 30 (Fig. 5). The cam 46 has a path, made up of a rise portion 47, a high dwell portion 48, a drop portion 49 and a low dwell portion 50, in which a roll 51, carried by push rod 45, is adapted to ride. The shaft 30 is shown in the same angular position in Figs. 4 and 5. Thus, it will be seen that the stop plates 11, which have been held elevated during the reverse movement of belts 10, are just about to drop for as roll 51 enters cam path 47, push rod 45 will be forced to the right and this will turn shaft 42 and links 41 in a counterclockwise direction and lower bars 40 and all of the plates 11. It will be noted that as the plates 11 drop, belts 10 are stationary and as soon as the plates have been lowered the belts advance. During the advance travel of the belts, the roll 51 rides in the dwell path 48, whereby plates 11 are held stationary in their lowered positions. As soon, however, as belts 10 complete their advance movement, roll 51 rides in the cam path 49, whereby the plates 11 are projected upwardly while belts 10 are at rest. The plates are held in their upwardly projected positions, when roll 51 rides in the dwell path 50, and during this interval the belts 10 are moved rearwardly.

Thus, confections herein shown as biscuits $b$, when placed by hand or in any other suitable manner, on the first belt 10 of the series will be alternately moved ahead and then back by each of the belts. As the first belt 10 moves forwardly, the confection is transferred to the next belt, being carried over the gap while plate 11 is down. The travel of each belt is enough to insure the transfer of the confection to the next belt of each series but no more. As a consequence, the confection is left on the second belt of the series when the belts come to rest. Then plates 11 are elevated into the positions shown and, while they are held thus elevated, all the belts 10 are moved backwardly, thus drawing all the confections up against plates 11 and alining them in rows. After belts 10 come to rest at the end of their rearward travel, the plates 11 are lowered and then the belts 10 are again advanced, whereby the confections are advanced another step. They are thereafter repeatedly alined and repeatedly advanced in a similar manner until they arrive at their destination.

While seven belts 10 have been shown, a greater or less number may be used as may be found necessary or desirable for the particular purpose. One or two might suffice under some circumstances. I prefer a greater number, however, because more time is allowed for an operator to inspect the confections. That is, it is frequently necessary to pick out broken confections, turn over confections which may lie wrong side up, fill in occasional gaps in the transverse rows, and so forth and, with the illustrated arrangement, the confections are before the inspecting operator for an interval amply sufficient for this purpose. The provision of several belts is also an insurance that the desired result as to alinement will be obtained. If for any reason, the confections are not alined, while on the first belt, they surely will be properly alined before they pass all of the belts of the series.

In many cases, it is necessary to arrange the confections in longitudinal as well as transverse rows and for this pupose a series of guide strips 52 are provided. These strips extend longitudinally with respect to belts 10 and are disposed in laterally-spaced relation. Each strip overlies all of the belts 10 and has its lower edge disposed closely adjacent thereto, except that at longitudinally spaced intervals it is bent upwardly to form recesses 53, which afford clearance spaces for the stop plates 11 to move upwardly into the illustrated position. These strips 52 mark off the feeding surface, composed of the upper stretches of the several belts 10, into lanes or channels in which the confections are forced to travel in the desired longitudinal alinement. The several guide strips 52 are supported near each end in any suitable manner, which will permit lateral adjustment thereof, whereby to vary the width of the lanes and adjust them to confections of various widths. As shown, a cross bar 54, supported at its ends by standards 55 from side frames 13, is provided adjacent the first and last belt 10 of the series. Each cross bar 54 overlies all of the guide strips 52 and has a long slot 56 (Fig. 3) through which a series of studs 57, one connected with each guide strip, pass. Each stud is fixed to the upper end of a member 58 and each member 58 is connected at its lower end to a guide strip 52. Thumb nuts 59, threaded on the studs 57, serve to clamp the members 58 to the cross bar 54 and thus to hold the guide strips 52 in position. The slot 56 permits the studs to be moved to any desired lateral positions and thus enables the guides 52 to be adjusted to suit the particular work in hand.

For the purpose of automatically feeding confections to the first feed belt 10 of the feeding and alining mechanism, I prefer to employ a feeder of the type illustrated in Fig. 1ª. The feeder there shown, is constructed along the same general lines and is designed to accomplish the same purposes as that disclosed in U. S. Letters Patent to Carlson No. 791,243, dated May 30, 1905. It does differ from the feeder of said patent in the manner in which it is driven,—being coordinated with the feeding and alining mechanism. The feeder will require but brief description herein. It includes a feed belt 60, the upper stretch of which is trained over a table 61, supported at one end by frames 13 and at the other end by a pedestal 62. This belt is driven by a roll 63 fixed to a shaft 64, mounted in pedestal 62. The other end of the belt 60 may be adjusted vertically and horizontally by turning the screws 65 and 66, respectively,—these adjusting devices being of common and known form. Overlying the feed belt 60 are a series of longitudinally-disposed guide bars 67, similar to those of the Carlson patent. The confections are contained in a hopper 68 and this hopper, as well as the bars 67, is vibrated laterally by the usual or any suitable mechanism. As indicated, such mechanism comprises a lever 69 which is connected by a link 70 to a crank 70' fixed on a shaft 71 to be oscillated thereby. Confections are delivered from hopper 68 onto the feed belt 60 and the bars 67 function in the usual way to insure the desired lateral spacing of the confections on belt 60 at the time they reach the delivery end of the belt. Also, of course, the confections are so spaced as to ride into the lanes between the guide strips 52, which function to preserve the lateral spacing, once it has been effected by bars 67.

The feed belt 60 is driven intermittently, rather than continuously as formerly, and is made to advance when belts 10 advance and remain stationary at all other times. The degree of advance movement of belt 60 is not, however, necessarily the same as that of belts 10. By preference belt 60 is advanced just enough at each operation to insure that one row of confections only is moved over onto the first belt 10. To secure these results the following means are provided. A ratchet 72 is fixed to shaft 64 and engaged therewith is a pawl 73, pivotally carried by the upper end of a lever 74, which is mounted at a point intermediate its ends to turn freely on shaft 64. The lower arm of lever 74 is provided with a slot 75 to permit adjustment of a link 76, which connects the lever 74 to one arm of a bell crank lever 77, mounted to turn freely on shaft 30. The other arm of lever 77 is connected by a link 78 to a lever 79 fixed to the shaft 27 which, as described, serves to operate the feed belts 10. Shaft 27, as viewed in Fig. 1ª, turns in a counterclockwise direction in order to advance belts 10 and such movement of shaft 27 will move pawl 73 in a direction such as to turn ratchet 72 and thereby advance belt 60. The extent of movement of belt 60 may be varied by varying the point of connection of link 76 to lever 74, whereby the feeder may be made to function in the desired way with confections of various other lengths than those illustrated.

The shaft 30, from which all the mechanisms thus far described are operated, is driven in timed relation with the confection making machine, as for example by a shaft 80 and bevel gearing 81. Shaft 80 also drives by a chain 82 the shaft 71, by which the hopper 68 and guide bars 67 are oscillated.

While the confection making machine may take various forms, I have shown it in connection with a depositor, designated generally as D in Fig. 1ᵇ. The depositing mechanism proper is, or may be, like that shown in my U. S. Letters Patent No. 1,169,602, dated January 25, 1916 and need not be described in detail herein. It will suffice to state that it includes a transverse row of nozzles n, through which confectionery material contained in a hopper h is discharged by suitable pump mechanism and deposited on confections positioned therebelow. The hopper h and the nozzles n carried thereby are, as usual, mounted on a pair of side frames f in a manner to permit longitudinal adjustment, whereby the nozzles n may be moved to the right or left, as viewed in Fig. 1ᵇ, to secure proper location of them with respect to the particular confections being fed to them. The pump mechanism is driven from a shaft s, mounted in frames f, and this shaft is arranged to drive the described shaft 80 by bevel gearing 83. The pump mechanism is intermittently operated. The arrangements, thus far described, are disclosed in the last named patent to which reference is made for a more complete disclosure.

The side frames 13 of the feeding and alining mechanism are supported from the side frames f of the depositor. For example, two channel irons 84 are fixed to frames 13, as shown in Fig. 2. A rod 85 extends across between the pair of frames 13 and at its ends is reduced in diameter. These ends pass through frames 13 and channels 84 and are threaded to receive nuts 86. A spacing sleeve 87, encompassing each of said reduced ends, is interposed between the inner face of each channel 84 and the outer face of the adjacent frame 13. The nuts 86 serve to hold the frames to the channels and to hold the two frames in proper laterally-spaced relation. There are at least two of the rods 85, one being shown in Fig. 1ª, and another in Fig. 1ᵇ. The side frames are also tied together at points below channels 84, as by similar cross bars 88 and nuts 89. The channels 84 extend well beyond the right hand ends of frames 13 and are supported at two spaced points from depositor frames *f* in a manner to permit vertical adjustment. For example, the channels 84 have fixed to their lower faces pairs of oppositely located brackets 90 and a rod 91 passes through and connects the brackets of each pair. Each of the two rods 91 also passes through the depositor frames *f* and is supported therefrom for vertical adjustment by screws 92, arranged one near each end of each rod 91 and mounted to turn, but not to move axially, in frames *f*.

The mechanism associated with the depositor D, whereby the confections are moved into and out of position to receive the deposits from nozzles *n*, is specially designed to cooperate with the feeding and alining mechanism and will be described in detail. The confections are delivered by the feeding and alining mechanism to a belt 93, which for a portion of its upper stretch travels over a table 94. The latter, at the end adjacent the last feed belt 10, is provided with a thin plate 95 so that the belt 93 is made to turn an abrupt corner in passing from its lower to its upper stretch. At the other end of the table are fixed brackets 96, which are mounted to turn on a shaft 97. The latter is rotatably mounted near its ends in brackets 98, secured one to each channel 84. Between the brackets 96 and fixed to shaft 97 is a roll 99, which drives belt 93. A series of idler rolls 100, together with an idler roll 101, guide belt 93 in the manner shown. The rolls 100 are mounted in bearings supported from channels 84 but the roll 101 is rotatably supported from brackets 96. The described arrangement permits the table 94 and with it the left hand part of belt 93 (as viewed in Fig. 1ᵇ) to swing up or down about the shaft 97 as an axis. The table 94 has depending side flanges 102, which support between them a shaft 103. Pivotally connected to the latter are one or more members 104, which are adjustable as to length and at their lower ends are forked to straddle a shaft 105, mounted in frames *f*. Each member 104 carries a roll 104' which rides on a cam 106, fixed to shaft 105. The latter is driven by a chain 107 from, and at the same speed as the shaft *s*, above described.

Cam 106 is constructed so as to raise table 94 during one third of its revolution, to permit table 94 to lower during the succeeding one third of a revolution and to permit it to remain stationary during the remaining one third of a revolution. When roll 104' rides on the dwell portion of cam 106, table 94 is so positioned that the upper stretch of belt 93 lies substantially in the same plane as feed belts 10. The cam 106 is driven in timed relation with cams 31 and 46 and all these cams turn at equal speed. Cam 106, as shown, is arranged to start the rising motion of table 94 immediately after belts 10 come to rest at the end of their advancing movement and to effect this movement during an interval, comprising all of the interval when the stop plates 11 are rising and the first half of the interval when the belts 10 are moving rearwardly. The table falls during an interval, comprising the last half of the interval when belts 10 are moving rearwardly and the interval when the stop plates 11 are falling. The exact timing described may, of course, be varied within limits, as is necessary or desirable to effect different kinds of work. Such timing may be varied by changing the setting of the cam on shaft 105.

Figures 9, 14:
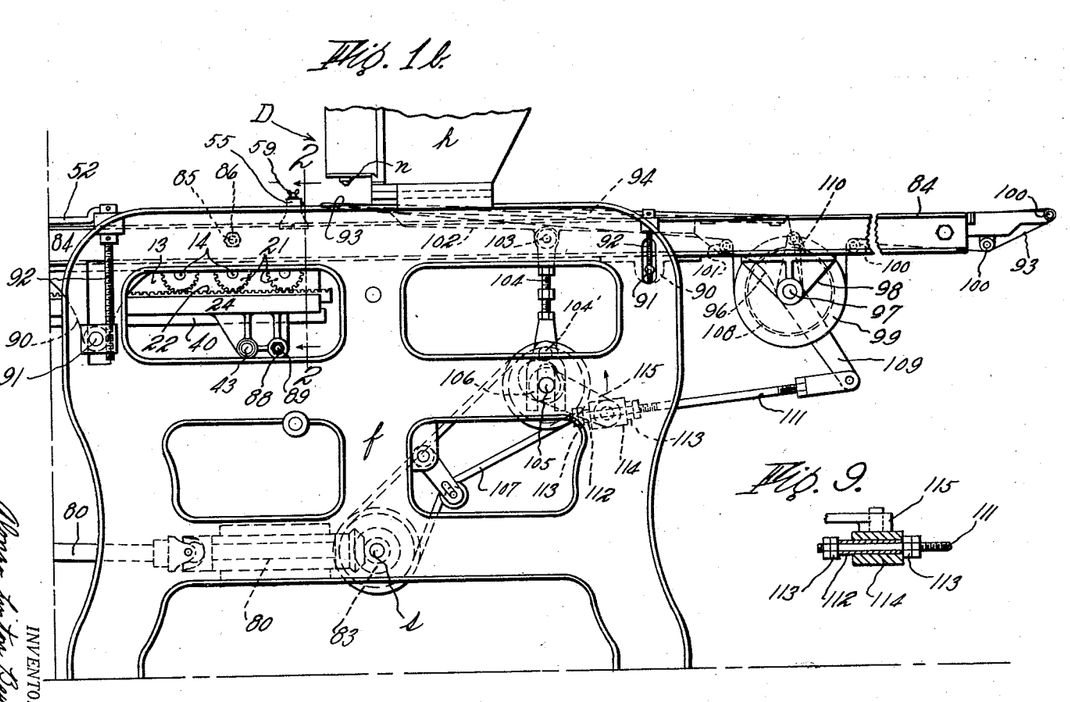
Fig. 9 is a fragmentary sectional view showing a detail of the mechanism for operating the feed belt of the depositor.

The feed belt 93 is driven intermittently by the following means. Shaft 97 has fixed thereto near its rear end a ratchet 108 and adjacent the ratchet and mounted to turn freely on shaft 97 is a lever 109, which carries a pawl 110 to engage the ratchet teeth. A link 111 is connected at one end to lever 109 and at the other end carries a bushing 112 which is fixed thereto in a manner to permit longitudinal adjustment,—being clamped thereto by and held between nuts 113 as best shown in Fig. 9. The bushing 112 slides in a block 114 which is pivotally supported in the outer end of a crank 115 fixed to shaft 105. The link 111 is moved only by the abutment of block 114 with one or the other of nuts 113 and, being longer than block 114, a "lost motion" connection is afforded with the link 111, whereby the pawl 110 will be caused to dwell at the end of its forward and backward strokes. The pawl 110, therefore, functions to drive belt 93 only during an interval of rotation of shaft 105 which is considerably less than 180 degrees. This interval, as shown, is a little greater than that during which the feed belts 10 are driven forwardly. As shown, crank 115 is so positioned on shaft 105 as to simultaneously start the advancing movement of belts 10 and 93. Consequently, the belt 93 will continue to advance after the belts 10 have come to rest at the end of their advancing movement and after table 94 has commenced to rise. The exact time relation specified is not essential and may be, and frequently is, varied to effect different results in the form of the deposits made by nozzles *n*.

In operation, the belts 60 and 10 advance simultaneously and confections are delivered by belt 60 upon the first belt 10. After these belts stop the several stop plates 11 rise and, while the stop plates are held in their illustrated and elevated positions, the belts 10 are moved rearwardly. This causes the confections to abut the stop plates 11, whereby they are alined in rows. The confections, thus alined, progress from one belt 10 to another, being subjected while on each, to a similar alining action. They are finally delivered by the last belt 10 of the series to the depositor belt 93. As just described, the belt 93 is then positioned in the same plane as belts 10 and starts to move at the same time as belts 10. The row of confections will be moved the distance $x$ by the last belt 10, which will carry them onto belt 93 but not centrally below nozzles $n$. However, the belt 93 continues to move for a short interval after belts 10 have come to rest and this extra movement of belt 93 is made to bring the row of confections into the same vertical plane with nozzles $n$. This last increment of movement of belt 93 is, or may be, effected during the early stages of the rising of table 94. As belt 93 comes to rest the table 94 continues to rise and, after reaching its top position, immediately commences to lower. The deposits from nozzles $n$ are made while the confections are moving either toward or away from the nozzles, or both, according to the character of decorative deposit desired. After table 94 reaches its lower position, it dwells there until the belts 10 again start forwardly and, at such time, belt 93 also moves forwardly to carry the row of confections which have received the deposits, away from the nozzles.

Figure 8:
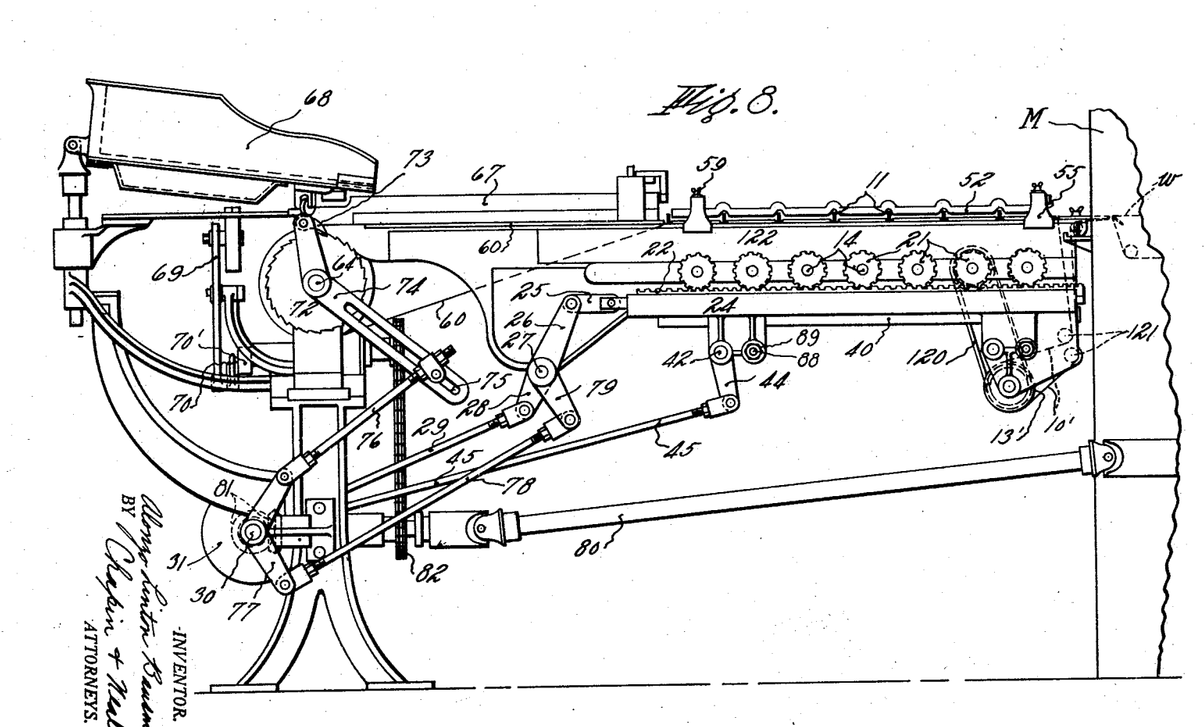
Fig. 8 is a side elevational view showing the application of the invention to a confection coating machine.

While the invention has been disclosed in connection with a depositor, as an illustrative example of one of its uses, it is equally capable of use in connection with other confectionery machinery and I have indicated in Fig. 8 an application of it to a confection coating machine. In this connection, the feeding and alining mechanism is constructed in essentially the same way and functions in substantially the same manner, as already described. Aside from differences in unimportant details, the only substantial change is in the location of the drive roll for the last feed belt of the series. Such feed belt, designated 10', has to extend into the coating machine M with its delivery end in closely adjacent relation with the wire belt $w$ of said machine. Accordingly, it is not feasible to locate the drive roll immediately below the confection-carrying stretch of belt 10'. Such drive roll, marked 13', is located below one of the other drive rolls 13 and driven therefrom by a chain 120 and suitable sprockets, as shown. Idler rolls 121 are provided to guide the belt 10' in the course shown. In Fig. 8, the side frames of the feeding and alining mechanism are merged with the table frame of the feeder,—the merged frames being designated 122. These frames are supported at one end from the pedestal 62 of the feeder and at the other end from the frame of coating machine M.

It is a matter of common knowledge that decorating attachments are used in conjunction with chocolate coating machines. These decorators many times require that the coated candies be fed to them in rows, which are alined both laterally and longitudinally. Hence, the feeding and alining mechanism of this invention has an important use in connection with a coating machine.

The invention has been disclosed herein, in an embodiment at present preferred, for illustrative purposes but the scope of the invention is defined by the appended claims rather than by the foregoing description.

What I claim is:

1. A feeding device for a confectionery machine, comprising, a flexible member adapted in one stretch of its travel to receive and carry confections, intermittently operable means for moving said member first in one and then in the opposite direction, a stop mounted to move into and out of the path of the confections carried by said member and in a path closely adjacent one end of said stretch, and intermittently operable means for moving said stop first in one and then in the other direction, said last named means operable to move the stop during periods of rest of the first named means.

2. A feeding device for a confectionery machine, comprising, a flexible member adapted in one stretch of its travel to receive and carry confections, means for moving said member back and forth, a stop mounted adjacent one end of said stretch for movement into and out of the path of the confections, and means for moving the stop so that it lies in the path of the confections as said member moves toward it and so that it lies out of said path as said member moves away from it.

3. Feeding mechanism for confectionery machines, comprising, a plurality of confection conveyers located one forwardly and in continuation of another with the delivery end of one in closely adjacent relation to the receiving end of the other for the transfer of confections from one to the other, a plurality of stops mounted one adjacent the receiving end of each conveyer and for movement into and out of the path of the confections carried by said conveyers, means for simultaneously moving all the conveyers forwardly to an extent sufficient to transfer the confections on one conveyer to the next conveyer and then in a reverse direction, and means for simultaneously moving all of said stops adapted to position them in the path of the confections during reverse travel of the conveyers and to position them out of said path during forward travel of the conveyers.

4. Feeding mechanism for confectionery machines, comprising, a series of plate-like supports arranged in a common plane and separated each from the other by a small gap, a flexible member trained over each of said supports, and adapted to receive and carry confections, means beneath each support for moving its member back and forth, a stop mounted to move in the gap between said supports, elevating means for simultaneously moving all of the stops from a position wherein they lie below the path of travel of the confections to a position wherein they obstruct the passage of confections from one member to another, and means for simultaneously moving all of the first named means so that the members are moved toward the stops when the latter are in the last named position and so that the members are moved away from the stops when the latter are in the first named position.

5. Feeding mechanism for confectionery machines, comprising, a series of plate-like supports arranged in a common plane and separated each from the other by a small gap, a flexible member trained over each of said supports and adapted to receive and carry confections, means beneath each support for moving its member back and forth by a distance greater than the length of its support, a stop mounted to move in the gap between each adjacent pair of supports, elevating means for simultaneously moving all of the stops from a position wherein they lie below the path of travel of the confections to a position wherein they obstruct the passage of confections from one member to another, and means for simultaneously moving all of the first named means so that the members are moved toward the stops when the latter are in the last named position and so that the members are moved away from the stops when the latter are in the first named position.

6. Feeding mechanism for a confectionery machine, comprising, a flexible member adapted in one stretch of its travel to carry confections, means for feeding confections to said member, intermittently operable driving means for simultaneously advancing said member and feeding means, a stop mounted to move into and out of the path which the confections take as they pass from the feeding means to said member, intermittently operable means for actuating said stop arranged to hold the same out of said path during the advancing movement of said member and feeding means and to project the same into said path after the last named movement, said driving means arranged to move said member rearwardly without moving said feeding means during the interval when said stop is projected into said path.

7. Feeding mechanism for a confectionery machine, comprising, a feed belt on which a plurality of longitudinal rows of confections are carried with the confections in each row in abutting relation, a flexible conveying member having one stretch of its travel alined with said feed belt to receive confections therefrom, a stop adapted to move into and out of the path which the confections have to take in passing from said belt to said member, intermittently operable means for advancing said feed belt while the stop lies out of said path to an extent sufficient to transfer one confection from each of said rows to said member, operating means for said stop adapted to project it into said path at the end of the advancing movement of the feed belt, intermittently operable means to move said member rearwardly while said stop lies in said path whereby the confections on said member are drawn back against said stop and alined in a transverse row, said last named means adapted to subsequently advance said member, and a conveyer to which the alined transverse row of confections is transferred by the advance movement of said member.

8. The combination with a depositor having an intermittently operable conveyer to successively position rows of confections in receiving relation with the nozzles thereof, of means for successively feeding alined rows of confections thereto, comprising, a plurality of confection conveyers located one forwardly of and in continuation of another with the delivery end of one in closely adjacent relation to the receiving end of the next, a plurality of stops mounted one adjacent the receiving end of each of the last named conveyers, means for simultaneously moving all of the last named conveyers first in a forwardly direction to transfer the confections on each conveyer to the next and the confections on the last conveyer of the series to the conveyer of the depositor and subsequently in a reverse direction, means for simultaneously moving said stops arranged to position them in said path during reverse movement of the last named conveyers and to position them out of said path during forward movement of the conveyers and means for raising and lowering the conveyer of the depositor with respect to its nozzles operable between succeeding forward movements of the last-named conveyers.

9. The combination with a depositor having an intermittently operable conveyer to successively position rows of confections in receiving relation with the nozzles thereof, of means for successively feeding alined rows of confections thereto, comprising, a plurality of confection conveyers located one forwardly of and in continuation of another with the delivery end of one in closely adjacent relation to the receiving end of the next, a plurality of stops mounted one adjacent the receiving end of each of the last named conveyers, means for simultaneously moving all of the last named conveyers first in a forwardly direction to transfer the confections on each conveyer to the next and the confections on the last conveyer of the series to the conveyer of the depositor and subsequently in a reverse direction, means for simultaneously moving said stops arranged to position them in said path during reverse movement of the last named conveyers and to position them out of said path during forward movement of the conveyers, means for raising and lowering the conveyer of the depositor with respect to its nozzles operable between succeeding forward movements of the last-named conveyers, and means for moving the conveyer of the depositor forwardly when the plurality of conveyers move forwardly and for continuing said forward movement after the last named conveyers have completed their forward movement and during the lifting of the depositor conveyer.

10. The combination with a depositor having an intermittently operable conveyer to successively position rows of confections in receiving relation with the nozzles thereof, of means for successively feeding alined rows of confections thereto, comprising a plurality of confection conveyers located one forwardly of and in continuation of another with the delivery end of one in closely adjacent relation to the receiving end of the next, a plurality of stops mounted one adjacent the receiving end of each of the last named conveyers, means for simultaneously moving all of the last named conveyers first in a forwardly direction to transfer the confections on each conveyer to the next and the confections on the last conveyer of the series to the conveyer of the depositor and subsequently in a reverse direction, means for simultaneously moving said stops arranged to position them in said path during reverse movement of the last named conveyers and to position them out of said path during forward movement of the conveyers means for raising and lowering the conveyer of the depositor with respect to its nozzles operable between succeeding forward movements of the last-named conveyers, a table over which the receiving end of the depositor conveyer travels pivoted at a point remote from said end, and means for positioning said table so that the receiving end of the depositor conveyer is alined with the last conveyer of said series during forward movement thereof and so that it is lifted toward the nozzles of the depositor after said forward movement and subsequently lowered before the next succeeding forward movement.

11. A feeding device for a confectionery machine comprising, a flexible member on one stretch of which a plurality of confections are carried in laterally spaced relation, a stop plate extending transversely with respect to said member and mounted closely adjacent one end of the confection carrying stretch of said member for movement into and out of the path of the confections carried thereby, means for moving said member back and forth in a longitudinal direction, and means for holding said stop plate in the path of the confections while said member moves in such direction as to carry the confections toward and into engagement with the same whereby the confections are alined in a transverse row and for moving the stop plate out of said path and holding it thus positioned while said member moves in the opposite direction.

In testimony whereof I have affixed my signature.

ALONZO LINTON BAUSMAN.